Patented Aug. 10, 1943

2,326,721

UNITED STATES PATENT OFFICE 2,326,721

CYANOETHYL ETHER OF TERTIARY AMINO ALCOHOLS

Herman A. Bruson, Philadelphia, Pa., assignor to The Resinous Products & Chemical Company, Philadelphia, Pa., a corporation of Delaware No Drawing. Application January 15, 1941, Serial No. 374,604

4 Claims. (Cl. 260—464)

This invention relates to 2-cyanoalkyl ethers of hydroxyaliphatic or hydroxyaraliphatic tertiary amines, the 2-cyanoalkyl group of which is a 2-cyanoethyl or 2-cyano-2-methylethyl group. These ethers may be used as insecticides and as intermediates in the preparation of drugs and textile assistants.

According to this invention the 2-cyanoalkyl ethers of hydroxyaliphatic tertiary amines or hydroxyaraliphatic tertiary amines are prepared by reacting acrylonitrile or α-methacrylonitrile in the presence of an alkaline condensing agent or catalyst with a hydroxyaralkyl tertiary amine, or a hydroxyalkyl tertiary amine, or a hydroxyalkyl tertiary amine the alkyl chain of which may be interrupted by oxygen, sulfur, or both oxygen and sulfur. These tertiary amines may have only one hydroxy-containing substituent or they may contain two or three such constituents. Similarly these amines may possess a constituent which contains more than one hydroxyl group. The exact nature of the constituents which are free from hydroxyl groups is unimportant. They may be aliphatic, alicyclic, heterocyclic, or aromatic. Also, two constituents may together provide a divalent group which jointly with the amine nitrogen forms a heterocycle.

Typical of the hydroxyl-containing tertiary amines which may be reacted as above are the following:

Hydroxymethyl dimethylamine
Hydroxyethyl dimethylamine
Hydroxypropyl dimethylamine
Hydroxyethyl diethylamine
Hydroxyethyl dibutylamine
Hydroxyethyl ethylphenylamine
Hydroxyethyl methyloctylamine
Hydroxyethyl diallylamine
Hydroxyethyl dimethallylamine
Hydroxyethyl cyclohexylmethylamine
Hydroxyethyl naphthenyl methylamine
Hydroxyethyl benzyl methylamine
Hydroxyethyl dicyclohexylamine
Hydroxyethoxyethyl dimethylamine
Hydroxyethoxyethyl diethylamine
(Hydroxyethylthioethyl) dimethylamine
(Hydroxyethoxyethylthioethoxyethyl) dimethylamine
Hydroxyethoxyphenyl dimethylamine
Hydroxyethyl piperazine
Hydroxyethyl morpholine
Hydroxyethyl pyrrolidin
Hydroxyethyl piperidine
2-hydroxypropyl diethylamine
3-hydroxypropyl diethylamine
2-hydroxypropyl di-n-butylamine
3-hydroxypropyl di-n-butylamine
2,3-dihydroxypropyl dimethylamine
Triethanolamine
Tri-isopropanolamine
N-cetyldiethanolamine
β-dodecyloxyethyl-N-diethanolamine
N-(β,β'-di(cetyloxyethyl)ethanolamine).

It is sometimes more convenient to name these amines as amino-alcohols, as in the case of 1,3-di(dimethylamino)propanol-2,N,N'-piperazinodiethanol, p-(N-dimethylamino)benzyl alcohol, etc.

As alkaline condensing agents there may be mentioned the oxides, hydroxides, alcoholates, or amides of the alkali metals or the alkaline earth metals and the free metals themselves. Also useful as catalysts are the strongly basic quaternary ammonium hydroxides, such as trimethylbenzyl ammonium hydroxide, dimethyl dibenzyl ammonium hydroxide, triethylbenzyl ammonium hydroxide, etc. The amount of alkaline condensing agent which is employed varies from about 0.5% to about 5% by weight of the amount of hydroxyl-containing tertiary amine used.

The reaction between acrylonitrile or α-methacrylonitrile and hydroxyl-containing tertiary amine takes place at ordinary to slightly elevated temperatures (about 0° C. to about 100° C.). In cases in which the reaction is spontaneous, it is generally desirable to cool at the start. Later the reaction mixture may be heated, a range of 40° to 60° C. being particularly desirable in this type of reaction. On the other hand, when initial reaction is sluggish, it may be accelerated by warming and somewhat higher temperatures used without excessive resinification. The reaction may be performed in the presence of solvents such as benzene, dioxane, ethyl ether, or water. It may be carried out with solutions, dispersions, or emulsions.

When the reaction has been carried to the desired point, the amino ether may be separated and purified, if desired. One convenient method of separation is by means of extraction. Another particularly useful method of separation and purification is distillation. Before the material is separated, however, it is desirable to neutralize the alkaline material present with an acid of sufficient strength, such as hydrochloric, sulfuric, phosphoric, etc., or an acid salt of a strong acid such as potassium or sodium acid sulfate,

Example 1

Powdered sodium methylate (1 g.) was added to 58.5 g. of hydroxyethyl diethylamine and the mixture was stirred and warmed to 50°–60° C. until a clear solution was obtained. It was then cooled to 20° C. and acrylonitrile (26.5 g.) was added dropwise while stirring and cooling, so that the temperature did not exceed 35° C. The mixture was then stirred for 24 hours at ordinary room temperature (25° C.), then carefully neutralized with the calculated quantity of hydrochloric acid required to react with the sodium methylate. The mixture was then extracted with ethylene dichloride and the extract fractionally distilled. The desired β-cyanoethoxyethyl-N-diethylamine

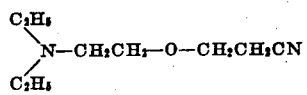

distilled at 120° C./10 mm. as a colorless oil with a yield of 57 g.

Following the above procedure but substituting an equivalent amount of methacrylonitrile for the acrylonitrile, there was obtained in fair yield a similar colorless oil, corresponding to the formula

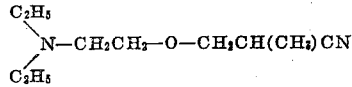

Example 2

To a solution of 1 g. of sodium methylate in 65.5 g. of N-hydroxyethyl morpholine 26.5 g. of acrylonitrile was added dropwise while stirring at 25°–35° C. during the course of 20 minutes. The mixture was then stirred 18 hours at 25° C., mixed with 10 cc. of water, and neutralized with the required theoretical quantity of hydrochloric acid. The solution was extracted with 100 cc. of ethylene dichloride, the extract filtered and distilled in vacuo. The desired β-cyanoethylethyl-N-morpholine

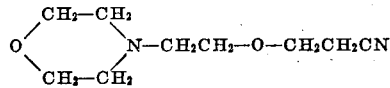

distilled over at 140–142° C./1–2 mm. as a colorless oil with a yield of 40 g.

Example 3

A mixture of 0.6 g. of sodium methylate and 85.5 g. of hydroxyethyl di-(2-ethylhexyl) amine was heated to 60° C. until clear, and then cooled to 20° C. Acrylonitrile (15.9 g.) was then added dropwise to the mixture while it was being stirred and cooled to 20°–30° C. After stirring for 2½ hours at room temperature, the mixture was warmed to 55° C. for one hour, then cooled and treated with slightly more than the calculated amount of hydrochloric acid required to neutralize the sodium methylate. The filtered product was then distilled in vacuo. The β-cyano-ethoxyethyl-N-di(2-ethylhexyl) amine

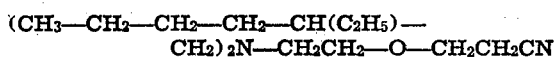

distilled over between 190° and 200° C./1 mm. as an almost colorless oil with a yield of 48 g.

Example 4

A mixture of 66 g. of hydroxyethylphenylethylamine, 0.8 g. of sodium methylate and 25 g. of dioxane was heated at 50°–55° C. until all the sodium methylate had dissolved. The clear solution was cooled to 20° C. and acrylonitrile (21.2 g.) was added dropwise to the solution while it was being stirred and cooled to 20°–30° C. The mixture was then stirred for 18 hours at 25° C., and thereafter the sodium methylate was neutralized by the addition of slightly more than the calculated quantity of hydrochloric acid required for its neutralization. The mixture was filtered and distilled in vacuo. The β-cyanoethoxyethyl-N-phenyl-N-ethylamine

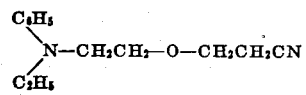

distilled over at 180–185° C./4 mm. as a pale yellow oil with a yield of 58 g.

Example 5

To a solution of 2 g. of sodium hydroxide, 2 cc. of water, and 47.6 g. of 1-dimethylaminopropanediol-2,3 there was added 42.4 g. of acrylonitrile while the temperature was maintained at 20°–25° C. The mixture was stirred 24 hours at 25° C., then warmed at 45° C. for 4 hours. The sodium hydroxide was then neutralized by adding slightly more than the calculated quantity of hydrochloric acid required for the neutralization, and the product was distilled directly in vacuo. The main fraction (33.5 g.) distilled over at 180°–190° C./2mm. as a pale yellow oil having the formula

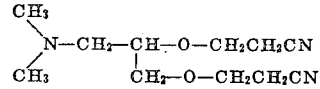

Example 6

Sodium methylate (2 g.) was dissolved at 60°–70° C. in 149 g. of triethanolamine and the clear solution was cooled to 20° C. The solution was stirred while 159 g. of acrylonitrile was added dropwise thereto during the course of one hour while maintaining the temperature between 20° and 40° C. The mixture was stirred thereafter for 16 hours at 25° C. and then shaken with 200 cc. of toluene. The toluene extract was washed with a small amount of dilute sulfuric acid solution which was then separated and the extract filtered. The toluene and traces of low-boiling impurities were stripped off by heating in high vacuo at 100° C. The residual oil weighed 301 g. and analyzed correctly for the compound having the formula

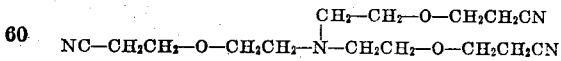

It was found to be very soluble in water.

Example 7

To a solution of 1.5 g. of potassium ethylate in 95 g. of tri-isopropanolamine there was added, with cooling and stirring, 79 g. of acrylonitrile at 30°–40° C. The mixture was stirred for 18 hours at 25° C., mixed with 25 cc. of water, and neutralized with hydrochloric acid. The solution was extracted with 150 cc. of ethylene dichloride and the extract evaporated to dryness on a steam bath under reduced pressure. The dark brown oil (177 g.) was then dissolved in toluene and filtered to remove impurities, after which the toluene was removed by distillation on a steam bath in vacuo. The residual product was a dark reddish oil, the analysis of which indicated that it consisted essentially of the triether having the formula

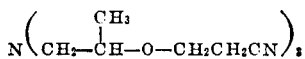

*Example 8*

To a solution of 0.8 g. of sodium methylate in 47.6 g. of dihydroxypropyl dimethylamine there was added dropwise during one hour 42.4 g. of acrylonitrile at 25° C. The mixture was stirred 21 hours at 25° C., then treated with the calculated quantity of hydrochloric acid required to neutralize the sodium methylate. The product was distilled directly in vacuo. The main fraction (33.5 g.) distilled over at 180°–190° C./2 mm. as a pale yellow oil having the formula $$(CH_3)_2N-CH_2-CH-O-CH_2CH_2CN$$
$$\phantom{(CH_3)_2N-CH_2-}CH_2-O-CH_2CH_2CN$$

The reactions described above are between nitriles having the formula $$CH_2=C(R')CN$$

wherein R' is hydrogen or a methyl group and hydroxyl-containing tertiary amines, having in the simplest cases the formula

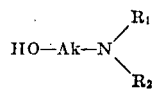

wherein Ak represents an alkylene, hydroxyalkylene, or aralkylene group, or such groups interrupted by oxygen or sulfur, $R_1$ and $R_2$ represent aliphatic, alicyclic, or aromatic groups, including additional hydroxyl-containing groups. Also, $R_1$ and $R_2$ taken together may represent a divalent group which jointly with the nitrogen forms a heterocycle.

I claim:

1. A 2-cyanoalkyl ether of a hydroxyl-containing tertiary amine selected from a member of the class consisting of amines containing a hydroxyaralkyl radical, amines containing a hydroxyalkyl radical, and amines containing a hydroxyalkyl radical the alkyl chain of which is interrupted by at least one member of the class consisting of oxygen and sulfur, said 2-cyanoalkyl group being selected from a member of the class consisting of 2-cyanoethyl and 2-cyano-1-methylethyl groups.

2. 2-Cyanoethoxyethyl-N-di-(2-ethylhexyl) amine.

3. Tri-N-(2-cyanoethoxyethyl) amine.

4. 2-Cyanoethoxyethyl-N-diethylamine.

HERMAN A. BRUSON.